United States Patent [19]

Caswell et al.

[11] Patent Number: 4,762,990
[45] Date of Patent: Aug. 9, 1988

[54] DATA PROCESSING INPUT INTERFACE DETERMINING POSITION OF OBJECT

[75] Inventors: Nathan S. Caswell, Yorktown Heights; Richard L. Garwin, Scarsdale; James L. Levine, Yorktown Heights, all of N.Y.

[73] Assignee: International Business Machines Corporation, Armonk, N.Y.

[21] Appl. No.: 789,610

[22] Filed: Oct. 21, 1985

[51] Int. Cl.$^4$ .......................... G01V 9/04; G01B 11/14
[52] U.S. Cl. .................................. 250/221; 250/222.1; 356/375; 340/709
[58] Field of Search ...................... 250/221, 222.1, 560; 340/555, 556, 709; 356/375, 376, 1, 4; 178/18, 19

[56] References Cited

U.S. PATENT DOCUMENTS

| | | | |
|---|---|---|---|
| 3,457,646 | 7/1969 | Schwemin | 33/1 |
| 3,553,680 | 1/1971 | Cooreman | 340/347 |
| 3,613,066 | 10/1971 | Cooreman | 340/347 |
| 4,294,543 | 10/1981 | Apple et al. | 356/375 |
| 4,420,261 | 12/1983 | Barlow et al. | 356/375 |
| 4,553,842 | 11/1985 | Griffin | 178/18 |
| 4,558,313 | 12/1985 | Garwin et al. | 340/709 |

FOREIGN PATENT DOCUMENTS 1575420  9/1980  United Kingdom .

Primary Examiner—David C. Nelms
Assistant Examiner—Michael Messinger
Attorney, Agent, or Firm—Alvin J. Riddles; John J. Goodwin

[57] ABSTRACT

The location of an object in a work area is established by sweeping a single light beam over the area and employing in coordinate calculations the rotational arc of the light source, and the serial events of the light variation when the beam is reflected from a mirror positioned on the opposite periphery intersects the object and the light variation when the beam directly intersects the object.

18 Claims, 4 Drawing Sheets

DATA PROCESSING INPUT INTERFACE DETERMINING POSITION OF OBJECT

DESCRIPTION

1. Technical Field

The technical field of the invention is that of providing information of the position of an object in a work area in a form for use in data processing apparatus.

2. Background Art

One method used in the art to convert the position of an object in a work area to data processing information has been to provide light parallel to the work area surface so that the light can be interrupted by an object. Signals produced when the light is interrupted by the object are then converted into coordinate information of the location of the object. Generally, the light is between a user and the work area and the object is positioned by the user.

The interruption of light has been employed in a variety of ways of which the following are exemplary.

In U.S. Pat. No. 4,294,543 two rotational scanning beams and continuous photodiodes are positioned around the work area so that interruption of specific beams by an object in the work area provides information from which the coordinates of the object can be determined.

In U.S. Pat. No. 4,420,261 sawtooth reflectors convert the sweeping light beams into an orthogonal raster where the beam which is interrupted can be used to provide coordinate information.

UK patent No. 1575420 describes the use of two separated sweeping beams with retroreflector enhanced background light level. In this patent angular information measured at the point of rotation, when a change in background light level occurs as a light beam is interrupted by the object, provides information to determine coordinates of the object.

The use of a single scanning light beam would permit simplification of the equipment.

In U.S. Pat. No. 3,457,646 a special probe is employed that provides a signal when the object in the work area is intersected by the sweeping light beam. This type of construction places a reflectivity limitation on the object.

In U.S. Pat. No. 4,558,313 the location of the object is determined by the difference in light level in an optical system having mirrors and retroreflecting members where the angular position of a single sweeping light beam when interrupted by the object is determined in relation to timing signals derived from light responsive members located on the periphery of the work area.

DISCLOSURE OF THE INVENTION

Figure 1:
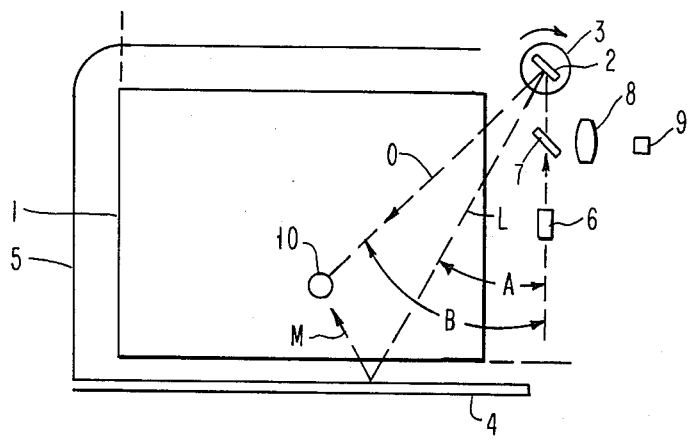
FIG. 1 is a schematic view of the invention illustrating the relative position of the components.

The invention provides ruggedness, simplicity and information flexibility in a data processing input interface by employing a single scanning light beam in a single scan sweep and serially detecting the angular position of the beam when there is a background light variation caused by the interruption of the beam after reflection striking a user positioned object in a work area and detecting the angular position of the beam when there is a background light variation caused by the interruption of the direct beam striking the user positioned object in the work area.

The invention employs an integrated light timing and rotational arc displacement system in establishing the coordinates of the location of an object in a work area by the angular displacement of a single scanning light beam from a starting position until the beam is interrupted by the separate serially occurring events of intersection of virtual image beam and the actual beam and employs a directly reflecting peripheral member, opposite to the location of the scanning light beam. A retroreflecting light enhancing peripheral member may be employed on portions of the remaining periphery to detect a variety of styli or omitted to detect a retroreflecting stylus.

In accordance with the invention, the single scanning beam source is positioned so that the direct beam will not only produce a light variation event when it intersects the user positioned object anywhere in the work area but the same object will again be intersected and will produce a light variation event from the reflection of the scanning beam from the directly reflecting peripheral member and the two light variation events will be angularly separated in the sweep.

The peripheral directly reflecting surface, such as an ordinary mirror, in which the direction of the reflected light varies with the angle of incidence, is placed along the periphery, edge or border of the work area opposite to the location of the scanning light source. The background light level may be maintained high with a retroreflective surface, such as a glass beaded surface, in which the angle of the light reflected is essentially independent of the angle of incidence, positioned around portions of the remaining periphery such as at least one of the remaining borders of the work area. An integrated light and timing system correlates variations in background light level with the angular displacement of the single scanning beam providing thereby both simplicity and information flexibility.

In a single sweep over the work area, where a single object is involved, the light level changes twice. Once when a beam reflected from the mirror angular displacement when the beam itself intersects the object.

The features of the invention provide with minimum parts, information for determination of coordinates of the location of the user positioned object based on a localized change of light level as serially related to both a reflected beam and an unreflected beam. The integrated timing, light level and displacement system permits the object, which may be an indicator member, a stylus or even a human finger to be free of any reflectivity requirements. Light variations of both polarities may be sensed providing thereby greater information capability.

For simplicity of explanation, the term stylus will be used for the user positioned object or indicator member, the location of which is to be determined. Further, while the work area in which the position is to be determined may be any planar area, the area is frequently rectangular and may be superimposed on a display.

Referring to FIG. 1, a schematic view of the invention is provided illustrating the relative positional relationship of the elements. In FIG. 1 a work area 1 has positioned, for coverage of the area in a single sweep, a movable mirror 2 provided with rotary motion by a motor 3, and having on one opposite peripheral border in the direction of a preferred virtual image of the mirror 2, a directly reflecting member 4, such as a mirror. Along other borders a retroreflecting material, such as a beaded glass strip 5 is provided.

In FIG. 1, the peripheral borders that involve axes through the source 2 may be considered adjacent and the others may be considered opposite. The directly reflecting surface 4 must be on an opposite peripheral border.

The rotating mirror 2 provides a single sweeping light source when light source 6, such as a laser, provides light directed at the mirror 2 through a partially silvered mirror 7.

The directly reflecting and retroreflecting members 4 and 5 in combination with the sweeping light from the mirror 2 produce a background light level against which variations in light level may be sensed. The light level including any variations thereof will be deflected or split off by the partially silvered mirror 7 to a focusing lens 8 which collects and focuses the light on a photocell 9.

In operation, the integrated light, timing and rotational arc determining system is employed. The system in FIG. 1 at the start of a sweep, by light from the rotating mirror 2, will provide a start signal by a sharp light level variation sensed by the photocell 9 when the light from the laser 6 is reflected directly back into the photocell 9 by the half silvered mirror 7 and lens 8. Assuming the sweep to be clockwise, after the "START" first abrupt variation in light level, when the sweeping light beam that is reflected from mirror 4 intersects the stylus 10 there will be variation in light level. This will occur at a rotational arc labelled A. In FIG. 1, the path of the light beam at this rotational arc is labelled L from the mirror 2 to the direct reflecting member 4 and is labelled M, from the direct reflecting member 4 along a line to the stylus 10. Continuing the sweep serially there will be a second variation in light level when the scanning light beam from the mirror 2 is directly interrupted by the stylus 10 at a rotational arc labelled B. The path of the light beam at this rotational arc is labelled O.

Figure 2:
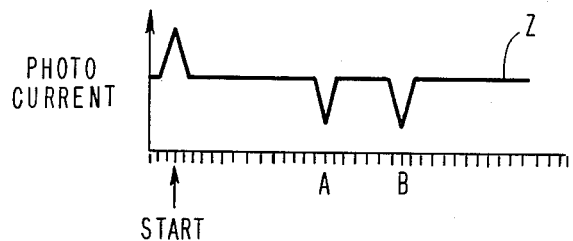
FIG. 2 is a graph showing the integrated light and rotational arc displacement relationship employed in the invention.

Referring to FIG. 2, a graph is provided of the integrated light and rotational arc displacement relationship employed in the invention. In FIG. 2 a general background light level, as indicated by the photocurrent from the photocell 9 is labelled Z. A direction of sweep is from left to right with a scale indicating incremental rotational progression. There is a first variation in light level in the form of an increase when the light from the laser 6 is directed from the moving mirror 2 into the photocell 9. This is labelled START. When the light beam from the moving mirror 2 has moved through the rotational arc A there will be a variation in light level labelled A and subsequently there will be a second variation labelled B when at a rotational arc B the beam is directly interrupted by the stylus 10.

It will be apparent from FIG. 2 that the integrated light and rotational arc displacement system provides, subsequent to a start signal, serially separated light variation signal events correlated with relation to rotational arc for the intersection of both a direct light beam and a reflected light beam, that signals of both polarities are available, and from the shape of variation signals there is correlation with the size of the object.

The different information, as described in connection with FIGS. 1 and 2, provides the basis for establishing the coordinates of the location of the user positioned object.

The coordinates are calculated employing trigonometric functions of the angles A and B and a fixed distance S from the center of the sweep axis to the location of the virtual image of this axis on a line through this axis an equal distance beyond the reflecting surface 4.

The X coordinate is established by the relationship expressed in Equation 1.

$$X = \frac{S}{2} \frac{\text{Tan } B - \text{Tan } A}{\text{Tan } A + \text{Tan } B} \qquad \text{Equation 1}$$

The Y coordinate is established by the relationship expressed in Equation 2.

$$Y = S \frac{\text{Tan } A \text{ Tan } B}{\text{Tan } A + \text{Tan } B} \qquad \text{Equation 2}$$

The calculations can be performed each time or stored for table look-up.

Figure 3:
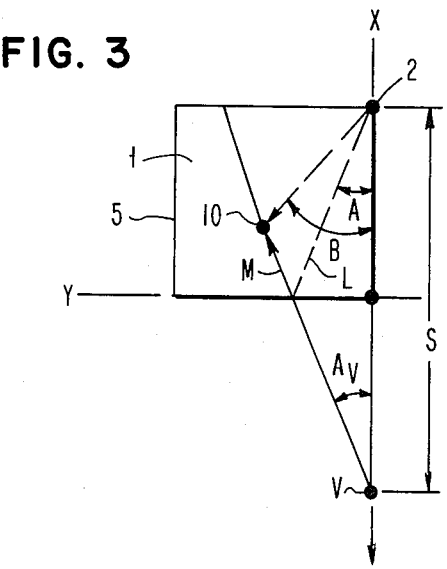
FIG. 3 is a diagram showing the principles of the determination of location of the object in the work area.

Referring next to FIG. 3, a diagram illustrating the geometry involved and the location of the virtual image is provided. In FIG. 3 the information provided by the structure and integrated light, timing and rotational arc displacement system of FIGS. 1 and 2 may be seen in relation to an optical diagram expanded to include the location of the virtual image. In the diagram of FIG. 3, the axis through the moving mirror 2 is extended an equal distance beyond an origin line through the reflecting surface 4 to point V. The distance is labelled S. This provides the virtual image location V for the source of the reflected beam M when beam L is reflected from mirror 4 to intersect the stylus 10. Since the angle subtended by the arc of rotation A is identical with the angle $A_V$ from the virtual image, position information for the stylus 10 is correlatable with the rotational arc A. Further since the direct beam O intersects the stylus 10 at rotational arc B serially in time but in the same sweep, the information from both is usable to establish coordinates by calculation in accordance with Equations 1 and 2.

In accordance with the invention the integrated light, timing and rotational arc displacement system takes light signals correlated with rotation and compares them with voltage magnitude and with digital time increments.

Figure 4:
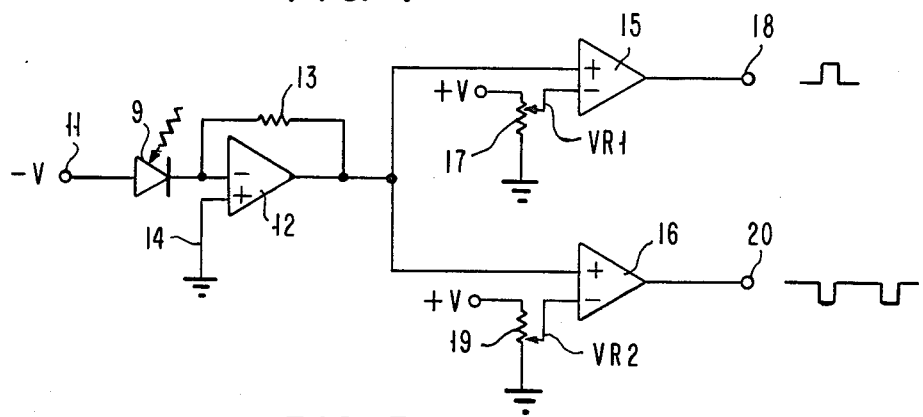
FIGS. 4, 5 and 6 are a schematic block circuit diagram and correlated voltage level and digital signal timing graphs for sensing and converting the optical signals.

Referring to FIG. 4, a schematic sensing circuit is illustrated. In the circuit, the output of photocell 9, supplied by voltage $-V$ at terminal 11. is passed through, a standard operational amplifier 12, with, connected through resistor 13 and reference terminal 14 to ground, the output being delivered to parallel voltage comparators 15 and 16. In voltage comparator 15, a high reference voltage VR1 for sensing positive signals such as the start light variation, is formed by tapping off from a potentiometer 17 between +V and ground thereby delivering at terminal 18 the digital signal corresponding to the start signal. In voltage comparator 16 a lower reference voltage VR2 for sensing negative variation, such as the A and B light variations, is formed by tapping from a potentiometer 19 between +V and ground and delivering at terminal 20 the digital signals corresponding to the light variations for angles A and B.

Figure 5:
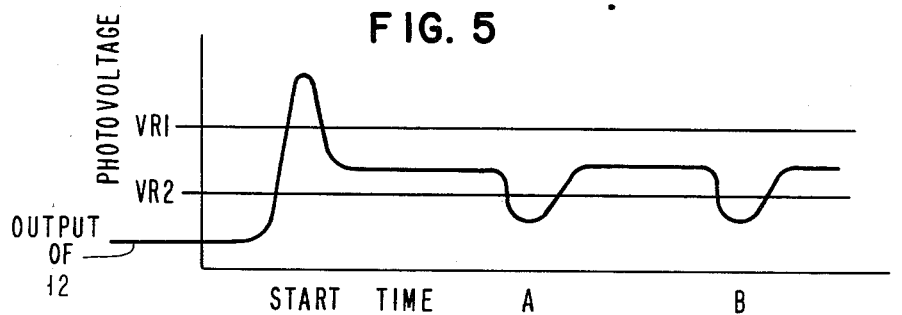
Figure 6:
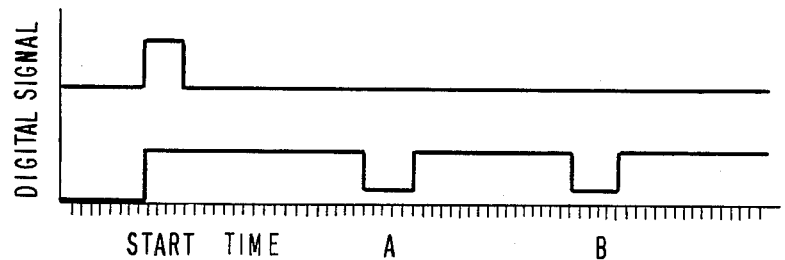

Referring next to FIGS. 5 and 6, the relationship of the photovoltage from the amplifier 12 and the reference voltages is shown. In the portion of the rotation where the sweep is over the work area, the output of 12 is lowest. At the point labelled Start when the revolving mirror sends the laser light directly into the photocell there is a sharp positive pulse which is converted in the comparator 15 to a positive digital pulse at terminal 18. When the light variation events at angles A and B occur, the difference in light level is such that the output of 12 is less than VR2 and the serial digital signals from voltage comparator 16 in the negative direction appear at terminal 20.

It will be apparent that, in addition to establishing rotational arc, there is also in the ability to sense both positive and negative variations in photovoltage and to set voltage reference levels the ability to find the center of a stylus as well as its diameter by translating both beginning and end of stylus observation photovoltage variations into a specific number of digital pulses.

In the integrated light, timing and rotational arc displacement system, the movement of the scanning light 2 during a sweep over the work area 1 is used to provide the signals of the type of Start, A, and B.

Figure 7:
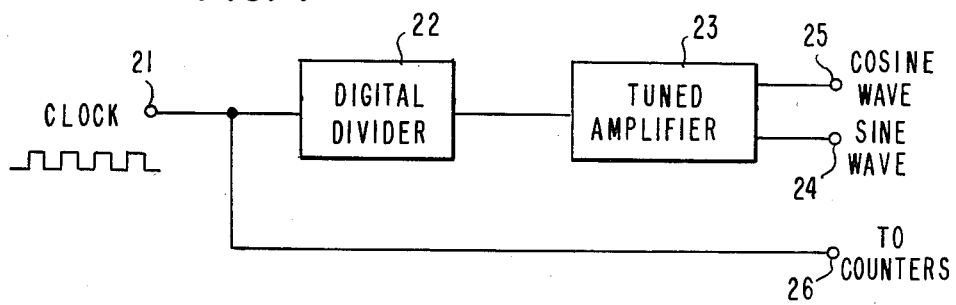
FIG. 7 is a schematic block diagram of the scan motor drive and timing signals.

Referring to FIG. 7, an illustration of the scan motor 3 driving signals and timing signal development is provided. A source of uniform timed digital pulses is provided at terminal 21 from a standard clock. The digital pulses are passed through a standard digital divider circuit element 22 and a tuned amplifier 23 to provide a source of sine waves and cosine waves on terminals 24 and 25, respectively, which are the standard input signals of a two-phase reluctance synchronous type motor. The clock pulses from terminal 21 are also provided at terminal 26 to the counters, not shown. These counters provide the scales of FIGS. 2 and 6, keep track of the pulses supplied to the motor 3 and of the number of pulses corresponding to the beginning and end of each light variation event as shown in FIG. 6. Because the synchronous motor moves through an angular arc related to the pulses provided, the trigonometric functions of the angles resulting from the rotational arc of the mirror 2 can be calculated.

BEST MODE FOR CARRYING OUT THE INVENTION

It will be apparent to one skilled in the art in the light of the principles set forth that many substitutions and refinements will be readily apparent to one skilled in the art.

There is in practice a tradeoff between complexity, resolution and the degree of information achieved from the system.

As illustrations of the considerations involved, in FIGS. 2, 4, 5 and 6, the sensing circuitry for the variations of the light can be readily extended, as resolution and information complexity requires, to include measurement of the diameter of a stylus to compensate for angular or tilted placement such as would occur with a human finger and to distinguish from other possible styli a reflecting stylus that produces a positive pulse.

Signal sources in the form of nonreflecting or highly reflecting inserts may be placed in elements 4 and 5 for start and stop signal purposes to thereby control portions of the sweep to which a specific timing relationship will apply.

When increased resolution becomes desired, accommodation for the effect on the light by intersections and light conducting members acquires increasing significance.

For higher resolution and freedom from the effects of foreign optically distorting material means may be provided to enhance the retroreflective light sensitivity and to remove light distortion at the intersection of the directly reflecting mirror surface 4 and a retroreflecting, beaded, surface 5.

Figure 8:
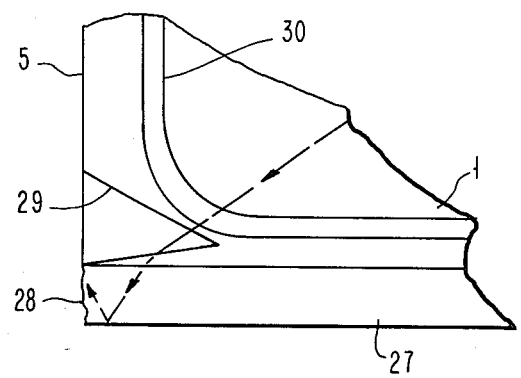
FIG. 8 is an illustration of optical compensation at a place where there are members with different optical properties.

Referring to FIG. 8, there is shown a detailed view of a portion of the work area 1, where a rear surface reflecting type mirror 27 is used for the element 4, intersects with a retroreflecting surface 5. As the light beam from the scanning mirror 2, shown as a dotted line, approaches 28, the end of the rear surface mirror 4, the light is refracted and reflected in such a way that it strikes the unfinished end 28 after the mirror rear surface of mirror 27. This can produce a dark line diagonally through the center of the work area, which is the region 1 of FIG. 1, and can interfere with detection of the user positioned object. Where needed, one means of avoiding the problem would be to use a front surface mirror for the element 4. Such mirrors however are expensive, vulnerable in handling and vulnerable to dirt in use. Another means of controlling the problem, as illustrated in FIG. 8, employs a retroreflective compensation piece 29 which can be placed at the intersection of elements 27 and 5 so that the light beam leaves the direct reflecting surface member 4 before the refraction and reflection in the member 27 permits light to reach the unfinished end 28. The compensation piece 29 is retroreflective on two of its faces and so provides continuous retroreflection of light as the beam sweeps around the junction between the mirror and the retroreflecting strip.

Referring further to FIG. 8, in order to prevent dust and other foreign material, which tends to attenuate the light, from entering the beaded surface 5 and from clouding the reflective surface of element 4 or 27, a transparent member 30, such as thin plastic, is placed around the periphery of the work area. Such a member 30 however has two closely parallel surfaces and while transparent at most angles of incidence there are optical properties such that light becomes trapped therein at bends such as when it rounds a corner. The compensation element 29 as shown in FIG. 8 by being extended beyond the main bend of the curve of element 30 reflects the light before it is trapped.

Figure 9:
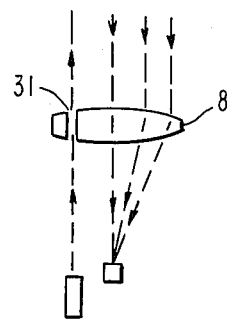
FIGS. 9 and 10 are illustrations of different structures for splitting off retroreflected light.
Figure 10:
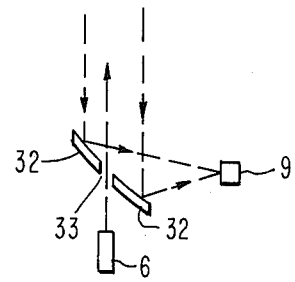

Referring next to FIG. 9 and FIG. 10, enhancement of retroreflected light sensitivity is illustrated. In FIGS. 9 and 10 two structures are provided for the splitting off, focusing and sensing of the light returned from the mirror 2. In these structures the loss that occurs from the use of a half silvered mirror is avoided.

Referring to FIG. 9, the light from the laser 6 is transmitted either through a non-refracting element 31 such as a hole, a flat or non-focusing region at one part of the converging lens 8. The reflected light from the mirror 6 is focused by the curved portion of the lens 8 on the photocell 9.

Referring next to FIG. 10, an arc shaped reflector 32 with a central opening 33 serves the function of permitting light from the laser 6 to pass through the opening 33 yet all retroreflected light is converged onto the photocell 9.

In each structure in FIGS. 9 and 10, there is no loss of the reflected light by having part pass through an element that must be adapted to also pass the light from laser 6.

The principle of the invention may be extended to include detection of more than one stylus in the same work area by using both direct and reflected light variation events from more than one peripheral directly reflecting surface or mirror.

Figure 11:
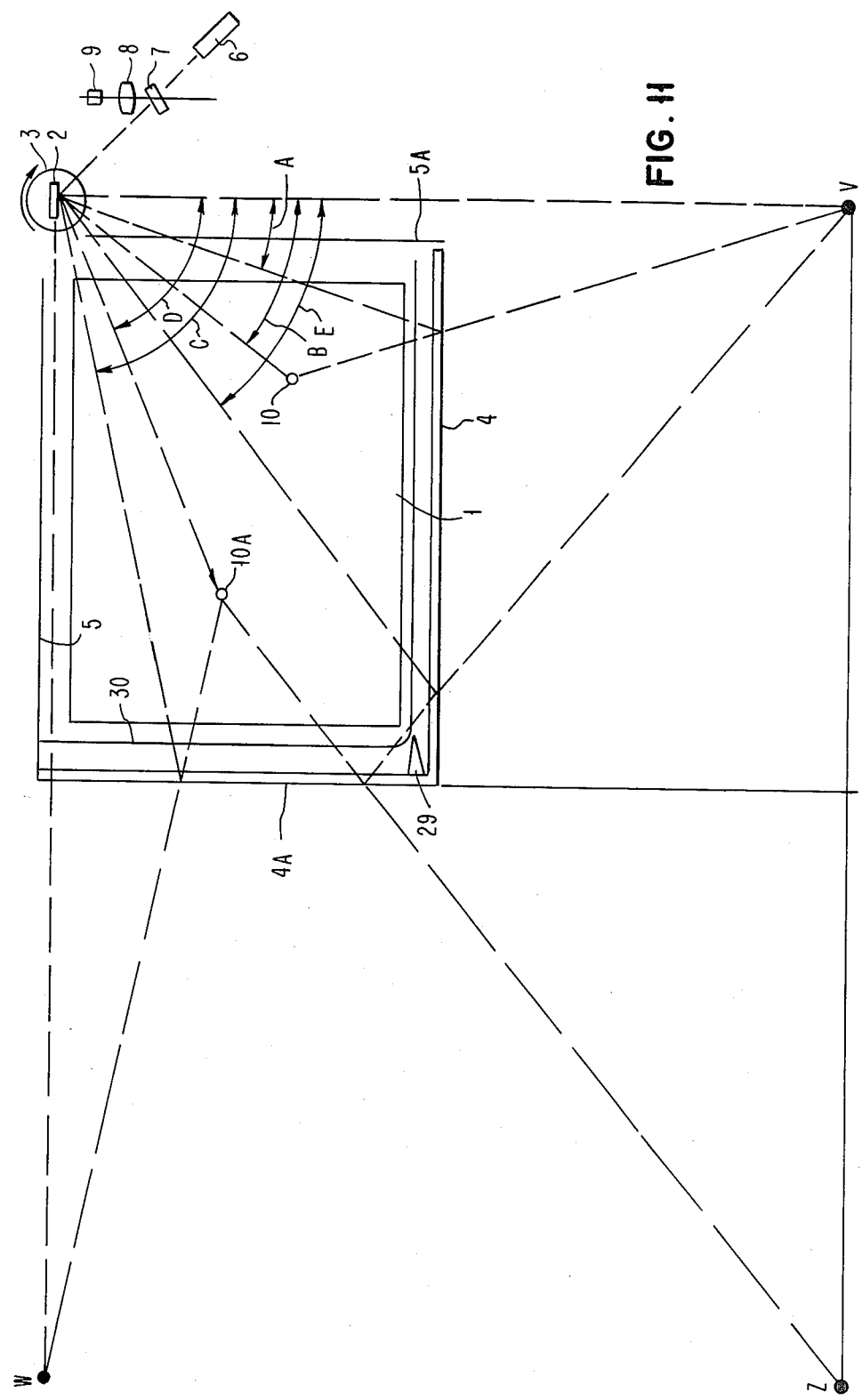
FIG. 11 is a schematic of an extension of the principles of the invention adapted for detection of more than one object.

An illustration of such an extension of the principle is shown in connection with FIG. 11 wherein like reference numerals with those of FIG. 1 are used. The directly reflecting peripheral member 4 is extended along the second peripheral side opposite to the scanning source 2 and is labelled 4A. The retroreflective peripheral member may be extended to the remaining sides and is labelled 5 and 5A. In FIG. 11 the virtual images in each axis through the scan mirror 2 perpendicular to the directly reflecting members 4 and 4A, V and W are employed so that as previously described for stylus 10, angle A would describe the rotational arc to the intersection of the reflected beam from 4 and angle B would describe the rotational arc for the direct beam. Similarly, where the virtual image is now located at W, rotational arc D for a stylus 10A would provide the direct beam intersection and rotational arc C for the reflected beam intersection.

Each stylus, 10 and 10A, produces a light variation pulse at a rotational arc corresponding to reflection by mirror 4, by direct view from the rotating mirror 2 and to reflection from mirror 4A.

In addition, there is a light variation corresponding to a scanner located at virtual image Z which is produced by reflection in both mirrors 4 and 4A. In FIG. 11 this would appear at rotational arc E.

It will be apparent to one skilled in the art that in accordance with the principles of the invention two styli of diameter small compared with the extent of the work surface can have their positions determined without ambiguity from the eight light level variations that are produced no matter how they are positioned so long as their size and proximity do not cause excessive loss of information due to light level variation overlap.

As the principle of the invention is extended, it is important to note that the order of serial occurrence of intersection of direct and reflected beams may change in applying the calculations of Equations 1 and 2.

What has been described is a simple, rugged and flexible data processing input interface using a scanning light by which a positioned object is detected by information gained from the serially occurring events of intersection with a reflected beam and intersection with a direct beam.

Having thus described our invention, what we claim as new and desire to secure by Letters Patent is:

1. In data processing interface apparatus for establishing the location of an object in a work area by detecting the interruption of a scanning light beam during a single sweep, the improvement comprising an object located in a work area surrounded by peripheral borders, a source of a scanning light beam for scanning said beam across said work area from an initial start position, means for determining the position of said object within said work area by measurement of the rotational arc of the scan of a single light beam from said initial start position to rotational angles represented by serially occurring signals produced by said beam striking said object after reflection from a peripheral border and directly striking said object.

2. The apparatus of claim 1 wherein said reflected beam reflected from said peripheral border is produced by a directly reflecting member located at said border and illuminated by said scanning light beam.

3. The apparatus of claim 2 wherein said means for determining the position of said object includes an integrated light responsive means, timing means and rotational arc displacement measuring system.

4. The apparatus of claim 3 including a light enhancement retroreflecting member located proximate to said directly reflecting member in a peripheral position at said border around at least a portion of said work area not covered by said directly reflecting member.

5. The apparatus of claim 4 where said work area is approximately rectangular and said directly reflecting member is a rear surface reflecting type mirror.

6. The apparatus of claim 5 including a retroreflective compensation piece located proximate to said retroflecting member and said directly reflecting rear surface mirror for preventing reflection and refraction from at leat one of an end of said rear surface mirror.

7. The apparatus of claim 6 wherein said work area is the face of a display.

8. In apparatus for extablishing the location of an object located in a work area that is bounded on at least one border with a directly reflecting member, the method comprising the step of scanning said object with a moving light beam from a light source the step of sensing through a single light responsive signal element signals indicative of the start of a scan of said light beam followed by signals due to the serial occurrence of a variation in light level produced by interruption, by said object, of said scanned beam of light and by interruption of said scanned beam by said object after said scanned beam has been reflected from said reflecting member, and the step of translating said sensed signals into location coordinates of the position of said object in said work area.

9. In data processing interface apparatus for providing location coordinates of the location of at least one stylus positioned within a two-dimensional work area, the improvement comprising a source of a single beam of light, means for rotating said beam of light through an arc to scan said area containing said stylus, means for generating a start signal at the beginning of said rotating scan of said beam of light, at least one directly reflecting member positioned at least along a portion of the periphery one dimension of said area, and an integrated photo responsive light sensing means, clock circuit timing and rotational arc displacement measurement counter means system operable to correlate rotational arc of said single light beam with the serial occurrence of said start signal followed by separate occurrences of light variation signals occurring when said rotating single light beam intersects said stylus in a single rotational arc both directly from said light source and after intersecting said stylus after said single beam has been reflected from said directly reflecting member.

10. The interface of claim 9 where said two dimensional work area is the face of a display.

11. A data processing input interface comprising in combination a two dimensional work surface area having peripheral borders, an object within said borders of said work surface area, a rotating single light beam source located at the periphery of said surface area and providing a single light beam sweeping in a rotational arc over said surface proximate and essentially parallel to said surface area, at least one directly reflecting member positioned along a portion of the periphery of said surface, means for generating a start signal at the beginning of said rotational arc means for serially detecting during a single rotational arc of said single light beam over said surface the serial occurrence of said start signal followed by first and second signals produced by light changes in said surface are as said light beam directly intersects and after reflection from said reflecting member intersects said object in said surface area, and means for correlating said start signal and said first and second signals produced each light change occurrence during said single rotation arc sweep of said rotating single light beam source.

12. The interface of claim 11 wherein said correlation means includes trigonometric establishment of X and Y coordinate values based on the size of said two dimensional work area and the amount rotational arcs of said rotating single light beam occurring from said generation of said start signal until said production of said signals due to first and second light changes are serially detected.

13. The interface of claim 12 where said rotating single light beam source, and said means for detecting first and second signals produced by said light change include respectively a laser directed at a rotating mirror, and a photocell adapted to receive light deflected from said rotating mirror.

14. The interface of claim 13 where said work area is essentially rectangular.

15. The interface of claim 14 where said at least one directly reflecting member is a rear surface mirror with means to direct said moving light beam away from the end thereof.

16. The interface of claim 15 including a retroreflective member along a portion of said periphery of said work area not occupied by said directly reflective member.

17. The interface of claim 16 wherein said members operable to deflect light and said focusing member includes an arc shaped reflecting member having an opening therein for passing light from a source to said moving mirror.

18. The interface of claim 16 wherein said focusing member includes a non-refractive region for passing light from a light source to said rotating mirror.

* * * * *